A. AAGAARD.
FISH HOOK.
APPLICATION FILED MAY 16, 1908.

973,246.

Patented Oct. 18, 1910.

WITNESSES:
Mathew J. Marty
M. A. Milord

INVENTOR
August Aagaard
BY Frederick Benjamin
ATT'Y.

UNITED STATES PATENT OFFICE.

AUGUST AAGAARD, OF ELGIN, ILLINOIS.

FISH-HOOK.

973,246.  Specification of Letters Patent.  Patented Oct. 18, 1910.

Application filed May 16, 1908. Serial No. 433,159.

*To all whom it may concern:*

Be it known that I, AUGUST AAGAARD, citizen of the United States, residing at Elgin, in the county of Kane and State of Illinois, have invented certain new and useful Improvements in Fish-Hooks, of which the following is a specification.

My invention relates to fishing tackle and refers especially to bait holding devices referring particularly to that class of contrivances for retaining live or artificial bait in proximity to the hook.

The chief objects of the improvements which form the subject matter of this application are:—to provide means attached to a hook for engaging a live minnow or other fish used as bait and securely holding the same in proper relation to the hook without injury thereto; to furnish a device of the character described so arranged as not to interfere with the natural movements of the fins; and to supply an appliance of this description that can be readily applied to the bait and as conveniently removed.

Further objects of this invention are:—to provide a simple and effective device for holding a live minnow, to furnish means for attaching hooks in different positions relative to the bait, and to supply a method of applying ballast to keep the fish in its natural position and to so design the contrivance as to permit the bait to have a certain freedom of vibration as it is moved through the water.

I accomplish the desired results by means of the appliance illustrated in the accompanying drawing forming a part of this application, the said appliance, described in a general way, consisting of a spring clasp or cradle formed of suitable wire and adapted to securely engage the body of a minnow or other small fish, provision being made for the attachment of hooks and sinkers, and a lure in the form of a spinner, the entire device having a swiveled attachment to a line in the usual manner.

I have shown the details of the preferred forms of the bait clasp in the following views:—

Figure 1:
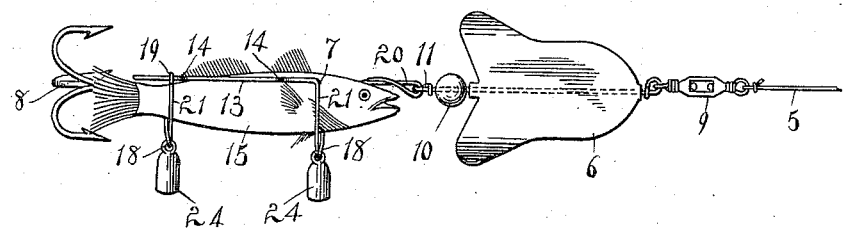
Figure 2:
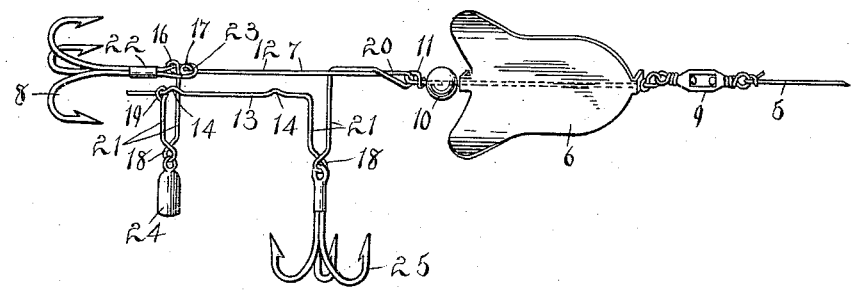
Figure 3:
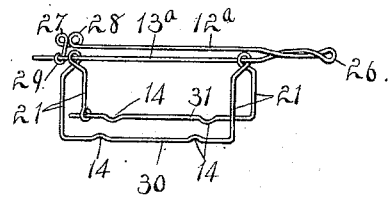
Figure 4:
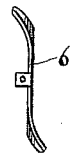

Figure 1 is a side elevation of a bait holding device, with attachment, applied to a minnow; Fig. 2 is a perspective view of the same device removed from the fish; Fig. 3 is a perspective view of a modified form of clasp, and Fig. 4 is an end elevation of the spinner detached from the line.

Referring to the details of the drawing the numeral 5 indicates a line, to which are attached in a tandem arrangement a spinner 6, a minnow clasp 7, and a hook 8, of the triple variety, the latter being rigidly affixed to the said clasp in a manner hereinafter described. A swivel 9 is interposed between the clasp and the line in accordance with the usual arrangement of such tackle, and a bead or ball bearing 10 guards the attachment of the spinner link 11 to the clasp 7. The said clasp is formed of a single piece of wire bent in the manner shown in Fig. 2. The clasp comprises two parallel members 12, 13, the former being straight, and the latter provided with bends 14 which project toward the member 12 and serve as retaining lugs for engaging the upper portion of the body of the bait 15 as shown in Fig. 1, thus holding the fish more securely than if the wire were straight. At the rear end of the member 12 the wire is given two complete turns to form a double eye indicated by the reference characters 16, 17, and the end of the wire is carried downward to a point below the body of the fish where it is twisted into an eye 18, and then brought up to the member 13 around which it is given a turn to form a fastening 19. The forward end of the member 12 is bent back upon itself and given a single twist to form a loop 20 for the attachment of the link 11 and then drops abruptly downward to a point approximating the level of the eye 18, where a similar eye is fashioned and the wire then passes upward and is bent at a right angle where it is continuous with the said member 13. The vertical portions 21 of the structure thus described are in this manner given considerable resiliency, partly from the inherent elasticity of the wire itself, but chiefly from the turns given the wire at the eyes 18 and the members 12, 13, are thus yieldingly held in the position shown in Fig. 2, forming clamping jaws adapted to securely engage the bait. The connection at the point 20 with said link 11 is a flexible one, while the shank 22 of the said hook 8, is rigidly fixed to the rear end of the member 13, by passing one side of the loop 23 of said shank through the eye 16, while the eye 17 is passed through said loop 23 from the underside and then bent or spread laterally to overlie and clamp the opposite side of the loop, as shown in Fig. 2.

It will usually be found necessary to furnish ballast for keeping the bait in an upright position and for this purpose I provide sinkers or weights 24, and attach them to the eyes 18. If desired one or both weights may be replaced by hooks as shown in Fig. 2, where one of the weights has been removed and an auxiliary hook 25 attached in its place, the said hook serving by its weight to aid in maintaining the equilibrium of the device.

In Fig. 3 is shown a modified construction of the clasp or cradle which is formed of two pieces of wire. The upper portion or support of the cradle is composed of two parallel members 12ª, 13ª, more closely approximated than in the case of the said members 12, 13, and devoid of lugs or bends between their ends. The wire forming these members is bent at approximately the middle point to form the loop 26 and the rear end of the member 12ª is bent into a double eye 27, 28, for the attachment of a hook, and the extremity is then carried over to the parallel member and given one or more turns thereabout, as indicated at 29. Upon the member 13ª is suspended an inverted bait clasp or cradle composed of a single wire having parallel portions 30, 31, provided with retaining bends or lugs 14, and suspended from the member 13ª by vertical portions 21, having eyes 18 through which the member 13ª is passed. This modified form of cradle will permit of more or less lateral oscillation upon the member 13ª, thus giving a natural appearance to the bait which is clasped between the vertical wires 21, the lugs 14 passing beneath the body of the minnow.

Having thus set forth the construction of my improved device and disclosed the method of inserting and securing the bait, no further description will be necessary to enable anyone skilled in the art to properly use the appliance.

Having thus described my invention what I claim, is:—

1. A bait holding device, comprising a clasp constructed of wire bent to form parallel clamping members connected by resilient loops, retaining lugs on the members, means for attaching a line to one end of the clasp, and means for attaching a hook to the opposite end of said clasp.

2. A bait holding device, including a clasp of wire bent to form parallel separable spaced clamping members, connections between said members, retaining lugs on the members, weights pendent from said clamping members, and means for attaching tackle to the opposite ends of the device.

3. A bait holding device, including a clasp of wire bent to form parallel clamping members spaced apart to receive the bait, expansible connections between the members, eyes formed in said members, and weights pendent from said eyes.

4. A bait holding device, including a clasp constructed of wire bent to form clamping members connected by loops, retaining lugs formed on the said members, and eyes formed at the extremities of the loops.

In testimony whereof I affix my signature in the presence of two witnesses.

AUGUST AAGAARD.

Witnesses:
  DAVID CARLSON,
  SINCLAIR J. NOBLE.